June 30, 1931.　　W. F. FUNK ET AL　　1,812,778

METHOD AND APPARATUS FOR SYNCHRONISM AND AUTOMATIC PHASE CORRECTION

Filed Nov. 16, 1928

INVENTORS:
Wilbur F. Funk
Edward J. Kruglak

Patented June 30, 1931

1,812,778

UNITED STATES PATENT OFFICE

WILBUR F. FUNK, OF MIDLAND BEACH, AND EDWARD T. KRUGLAK, OF JACKSON HEIGHTS, LONG ISLAND, NEW YORK

METHOD AND APPARATUS FOR SYNCHRONISM AND AUTOMATIC PHASE CORRECTION

Application filed November 16, 1928. Serial No. 319,926.

This invention relates to synchronizing and particularly to methods and means of securing synchronism of motion and phase relation (proper framing) in systems for the transmission of pictures and images by electricity.

An object of the invention is to maintain synchronism between two widely separated movable elements, such as the analyzing device at the sending station and the composing device at receiving station of a picture or image transmission system.

Various synchronizing systems have been proposed heretofore; but for the most part such systems required the production of separate synchronizing impulses to be sent in addition to the picture or image impulse proper.

A feature of our invention is the fact that no separate synchronizing impulses are transmitted to operate it; synchronization being obtained solely by means of grouping the electrical impulses that occur in transmitting the picture or image proper.

Another feature of our invention, consists in the provision of an automatic means for correcting any difference in the phase relation between the analyzing device at the transmitting station and the composing device at the receiving station.

Other features and advantages of the invention will appear from the following description and also from the appended claims.

In the drawings, Fig. 1 illustrates diagrammatically the circuit arrangement of the essentials of an image transmission system, including a sending and receiving station, and in which is embodied one form of apparatus used in our invention.

Figure 1:
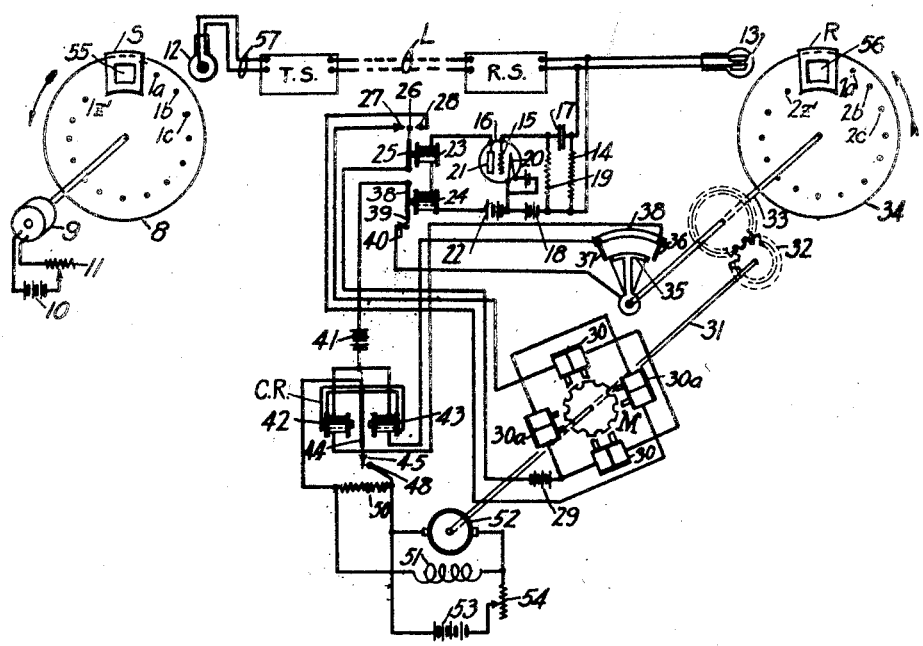

The equipment at the sending station shown at the left in Fig. 1, comprises a sending member which will be taken for purposes of illustration to be a rotating analyzing disk 8 having a spiral of analyzing openings $1a$, $1b$, $1c$, etc. The said disk 8 located behind the aperture 55 of analyzing screen S, is driven by motor 9 which is connected to a source of voltage 10 and a controlling resistance 11. Photo-electric cell 12 behind disk 8 is connected by means of circuit 57 to an amplifying and transmitting system T. S. which may be a radio telephone transmitter, wired wireless transmitter or other electrical means. At L is shown a means for carrying the transmitted energy to various receiving systems A. S., depending upon the character of the transmitting system T. S.

The equipment at the receiving station shown at the right in Fig. 1, comprises: a receiving system R. S. for the interception and amplification of the transmitted energy; the light emitting source 13 is connected to the output of the receiving system A. S. The composing member which will be taken for the purpose of illustration to be a rotating composing disk 34 with its composing openings $2a$, $2b$, $2c$, etc. is located behind aperture 56 of composing screen R. The resistance 14 is connected across the output of the receiving system A. S. One end of the resistance 14 is connected to one terminal of the condenser 17, the other end of resistance 14 is connected to one electrode of battery 18; the other terminal of condenser 17, and the other terminal of battery 18, are connected respectively to the grid 15, and the filament 20, of the thermionic tube 16. The resistance 18 is connected across the resistance 14, and condenser 17. The output circuit of the thermionic vacuum tube 16, includes the filament 20, plate or anode 21, plate current source 22, and electro-magnets 23 and 24. Electromagnet 23, controls the armature 25. Attached to the armature 25, is contact 26 which engages alternately with contacts 27 and 28, completing the circuit through the electric source 29 and the alternate electro-magnets 30—30, and 30a—30a respectively, of the phonic wheel motor M, causing said phonic wheel motor M to operate in a well known manner. The shaft 31, of the phonic wheel motor M, is attached to the mechanical transmission system 32. Shaft 33 is driven by said transmission system 32. The receiving composing disk 34, and the arc shaped contact 35, are fastened to the shaft 33. Contact 35 alternately engages contacts 36 and 37, once during each revolution of the shaft 33. Contacts 36 and 37 are attached to insulating piece 38, which is adjustably movable about the axis of the shaft 33. The length of arc of contact 35 is dependent upon the angle A on the transmitting analyzing disk 8. The arc of contact 35 intercepts an angle equal to or preferably slightly less than the angle A. The angular distance between the contacts 36 and 37 is approximately equal to the angle A on the transmitting analyzing disk 8. In any case, the contacts 36 and 37 are so spaced with regard to the contact 35 that only one of said contacts 36 or 37 can be engaged with contact 35 at any given instant.

The electro-magnet 24 controls the armature 38, to which armature is attached the contact 39. Contact 39 normally engages contact 40. The electric source 41, contacts 39, 40, 35, and alternately contacts 36 and 37, and respectively the electro-magnets 42 and 43 of the correcting relay C. R., which is preferably polarized, comprise a circuit for the control of the armature 44. Contact 45 is attached to the armature 44 and may engage contact 48. Resistance 50 is connected in series with the field winding 51 of a shunt type motor 52. The motor 52 is connected to a source of voltage 53 and a resistance 54. Resistance 54 is adjusted once for all so that the motor 52 turns the disk 34 at a higher speed than that at which the sending disk 8 is rotating when the resistance 50 is connected in series with the field winding 51. When resistance 50 is short circuited by the engaging of contacts 45 and 48, the speed of motor 52 is reduced to a value which will cause the receiving disk 34 to rotate approximately at the speed of the sending disk 8. The armature of the motor 52 is attached to the shaft 31.

Figure 4:
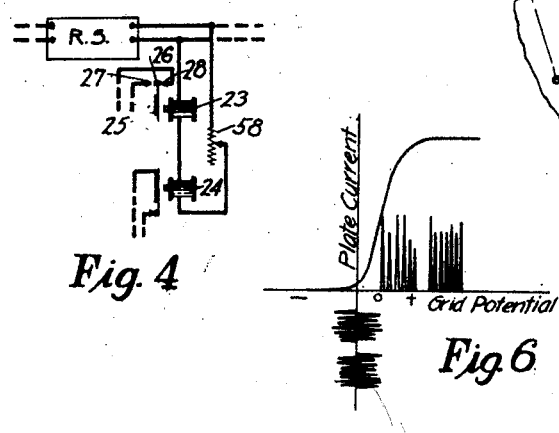
Fig. 4 illustrates diagrammatically one form of an alternative arrangement of apparatus, in which the control electro-magnets are connected directly in the output circuit of the image amplifying system.

In Fig. 4, the electro-magnets 23 and 24, together with variable resistance 58, comprise an alternative circuit connected directly to the output of the receiving system R. S. We prefer however to use the circuit shown in Fig. 1, since the operating characteristics of the synchronizing and phase correcting apparatus can be adjusted without affecting the energy applied to the light emitting source 13.

At the sending station the analyzing disk 8 in rotating, carries the various openings 1a, 1b, 1c, etc. across the aperture 55 of the analyzing screen S. The light reflected from the object being analyzed, passes thru the openings and impinges on the photo-electric cell 12. During the analyzing operation, the light impinging on the photo-electric cell 12 will vary in intensity in exact accordance with the light values of the successive elementary areas of the object. The variable light falling on the photo-electric cell 12 causes a variable current to flow in the circuit 57, in a manner well known to the art. This current may be amplified or introduced directly to the transmitting station T. S., which may be a wireless transmitter, well known in the art of wireless telephony; or a wired wireless transmitter; or any other known transmitting means. These electrical variations are then carried by the conducting means L, to the receiving station R. S. in well known manner. At the receiving station R. S. these electrical variations are amplified and applied to light producing source 13. The receiving composing disk 34 is constructed similar to the transmitting analyzing disk 8. The composing openings 2a, 2b, 2c, etc. on said disk 34 pass across the aperture 56 of the screen R, allowing the variable light of the light source 13 to pass to the aperture 56 of the screen R, thus reproducing the image.

Synchronism of rotation of the sending analyzing disk and the receiving composing disk is of vital importance. Synchronism may be obtained by our method, using the common type of disk wherein all the analyzing openings are arranged spirally and spaced at a uniform angular distance apart if used in conjunction with a screen having an aperture whose width is less than the angular distance between the analyzing openings. But mere synchronism of the speed of rotation is not alone sufficient for the proper reproduction of the image; in addition, we must have proper phase relation, that is, any given composing opening on the receiving composing disk must be in the same relative position as the corresponding analyzing opening on the sending analyzing disk, otherwise the image would not be properly framed in the aperture of the receiving composing screen.

In order to obtain proper framing automatically as part of our invention, we utilize at the sending station an analyzing disk, and at the receiving station a composing disk wherein the angular distance between the last and first openings on the spiral is different (greater or lesser) than the uniform angular distance between the other openings. For the purpose of illustration, the angular distance between the last opening and the first opening of the disks will be assumed as greater than the angular distance between the other openings.

The width W of the aperture of the sending analyzing screen S may be made greater or lesser than the uniform angular distance B between the analyzing openings. Obviously the width W of the aperture of the receiving analyzing screen is (regardless of the width of the sending aperture) made less than the angular distance B, so as to only permit one opening to pass across the aperture at any given instant.

Figure 2:
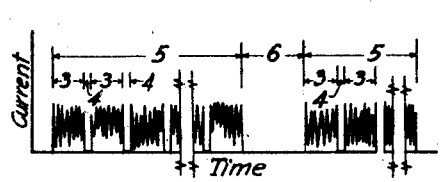
Fig. 2 is a graph illustrating the electrical variations produced during each complete analysis of the object, when the aperture of the analyzing screen has a width which is less than the angular distance between the individual openings.
Figure 5:
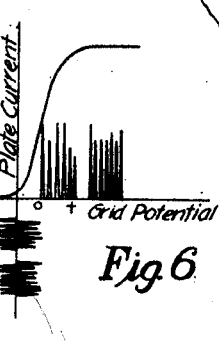
Fig. 5 illustrates a portion of the sending analyzing device, showing a few of its analyzing openings; and the analyzing screen with its aperture.

Referring to Fig. 5, when the width W of the aperture 55, of the transmitting analyzing screen S is made less than the angular distance B, is is obvious that an interval will elapse after analyzing opening 1a, passes from the aperture 55 before analyzing opening 1b starts to cross the aperture 55. During said interval the passage of light to the photo-electric cell 12 will be stopped and no current will flow in circuit 57. As soon as analyzing opening 1b starts its passage across the aperture 55, the light is again permitted to pass to the photo-electric cell 12, with the subsequent continually varying flow of current in circuit 57. This action is repeated as each analyzing opening enters and leaves the aperture. The electrical variations thus produced are shown in Fig. 2. The electrical variation 3 occurs during the passage of a transmitting analyzing opening as 1a, etc. across the aperture 55 of the analyzing screen S, while an object is being analyzed. The interval 4 represents the time elapsing between the passage of an opening as 1a, from the aperture 55, and the entrance of any succeeding opening as 1b. As previously stated, no light passes to the photoelectric cell 12 during the interval 4, hence no current will flow in the circuit 57. Obviously, the electrical variations caused by the light variations of the image are grouped, and such groups 3 occur a definite number of times per second, depending upon the number of openings and the revolutions per second of the transmitting analyzing disk 8. Since the number of openings are fixed for any given analyzing disk, the frequency of said groups 3, varies directly as the revolutions per second of the transmitting analyzing disk. This frequency will be called F. For example, in a disk with 50 holes in the spiral and said transmitting analyzing disk revolving at 10 revolutions per second, a frequency will be produced having a value of $10 \times 50 = 500$ pulses per second. Should the speed increase to 11 R. P. S. the frequency produced will be $50 \times 11 = 550$ pulses per second. The interval 6 represents the passage of the analyzing opening 1z' at the end of the spiral of the transmitting analyzing disk 8 from the aperture 55 of the analyzing screen S, and the entrance of the analyzing opening 1a, at the beginning of said spiral in the aperture 55 of the screen S. Since, as previously stated, the angular distance A between the last opening 1z and first opening 1a on the spiral of transmitting analyzing disk 8, is assumed to be greater than the uniform angular distance B between any other two openings as 1a and 1b, it is obvious that interval 6 is longer than the interval 4, and thus in effect, groups the impulses 3 into an impulse 5. This impulse 5 then occurs once for each complete passage of all the openings of said spiral across the aperture 55 of the analyzing screen S. The rate at which such impulse 5 occurs during a second depends only upon the revolutions per second of the transmitting analyzing disk 8. The frequency of their occurrence will be called "$f$".

Figure 3:
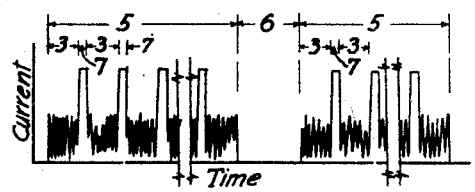
Fig. 3 is a graph illustrating the electrical variations produced during each complete analysis of the object, when the aperture of the analyzing screen has a width which is greater than the angular distance between the individual openings.

Referring to Fig. 5, when the width W of the aperture 55 of the transmitting analyzing screen S is made greater than the uniform angular distance B, it is obvious that for an interval both analyzing openings 1a and 1b will allow light to fall upon the light sensitive cell 12, with a subsequent continually varying flow of current in circuit 57. This current during said interval, has a value approximately twice as great as when only one analyzing opening is passing across the aperture 55 of screen S. The time interval during which this increased current flows in the circuit 57, depends upon the difference between the width W of the aperture 55 of the screen S, and the angular distance B between the analyzing openings 1a, 1b, etc. on the transmitting analyzing disk 8. The electrical variations thus produced are shown in Fig. 3. The electrical variations of current 3 occur at the same frequency as when only one analyzing opening such as 1a, 1b, etc. of the transmitting analyzing disk 8 is passing across the aperture 55 of the screen S. The current 7, flows in the circuit 57 during the interval when two openings such as 1a and 1b; 1b and 1c, etc. are passing across the aperture 55 of the screen S.

It is obvious that when the width W of the aperture 55 of the screen S is made less than the angular distance B between the various openings 1a, 1b, etc. the groups 3 are separated by an interval 4, during which no current occurs; also that when the width W of the aperture 55 of the screen S is greater than the angular distance B between the various openings 1a, etc. the groups 3 are separated by an interval 7 during which a pronounced increase of current occurs.

Figure 6:
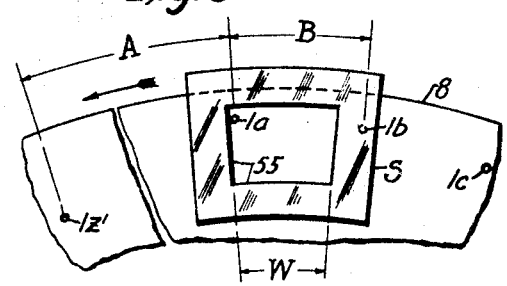
Fig. 6 is a graph illustrating the potential-current characteristics of the thermionic tube.

Referring to Fig. 1, the previously described frequencies "F" and "$f$", of the transmitted energy sent out by the transmitting station T. S., thru wire or by wired wireless, or by wireless apparatus well known in the art of wireless telephony, is received and amplified by the receiving system R. S. The output current of the receiving system R. S. operates the light producing source 13. This output current varies with the amplitude and frequency of the transmitted current. A portion of this variable current flows thru resistance 14, and sets up a variable voltage across it. This voltage is applied to the control grid 15, of the thermionic tube 16 through condenser 17. Battery 18, and resistance 19, maintain the grid 15, normally at a desired negative potential. The various circuit elements of the thermionic tube 16 are so selected and proportioned that the tube normally operates at the lower bend of its grid potential plate current characteristic curve as shown in Fig. 6. It is obvious that the impressed voltage variations on the grid 15 cause an increase in plate current when they are positive, and practically no change when they become negative. Hence, rectification occurs and variable unidirectional currents flow in the plate circuit of the thermionic tube 16. These currents correspond to the original currents in the circuit 57 as shown in Fig. 2. The electro-magnet 23 and armature 25, are responsive to the average value of the current impulse 3, occurring at frequency "F." Armature 25 operates at this frequency "F" causing contact 26 to engage alternately with contacts 27 and 28, energizing electro-magnets 30—30 and 30a—30a which operates phonic wheel motor M, in a well known manner. It will thus be obvious that should the speed of the transmitting analyzing disk 8 vary, the frequency "F", of the transmitted energy and likewise the armature 25, will vary accordingly thus increasing or decreasing the speed of the receiving analyzing disk 34, so as to keep it in synchronism.

Let us assume the receiving composing disk 34 may have been started when a given composing opening as 2z′ was not in the same relative position as the corresponding analyzing opening 1z′ of the sending analyzing disk 8, so that while the disks are in synchronism as to speed of rotation, still the image is not properly framed in the aperture 56 of the screen R. Referring to Fig. 1, in starting the rotation of the receiving composing disk 34, the armature 44 of the polarized correcting relay C. R. should be in such position that contact 45 is not engaged with contact 48. The electro-magnet 24 and armature 38, comprise a relay of the "slow acting type," well known to the art, designed to respond to the impulse currents of frequency "f". That is, when currents flow during the first impulse 3, the armature 38 operates and remains operated during the interval 4, and during the remainder of the period when the openings on the transmitting analyzing disk 8 are passing across the aperture 55 of the screen S. However the interval 6 occurring at the end of said passing is sufficiently long so that the armature 38 will be released and return to normal. When the armature 38 operates, the contacts 39 and 40, which are normally closed, are opened.

Due to the adjustment of the resistance 54, and (when the receiving disk 34 was started up), the placing of armature 44 so that contact 45 does not engage contact 48, the motor 52 will rotate the receiving composing disk 34 at a higher speed than the sending analyzing disk 8, the torque of the motor 52 is therefore greater than the torque of the phonic wheel motor M, causing it to "slip". It is obvious that after several revolutions of the disk 34 the given opening 2z′ will have advanced a sufficient amount with respect to opening 1z′, so that the contact 35 will be engaging contact 36, when the transmitted impulses cease. Thus, the armature 38 will return to its normal unoperated position and contact 39 will engage contact 40, thus completing the circuit thru the electro-magnet 42 and operates the armature 44. But the armature 44 had already been placed in this operated position, so the disk 34 completes another revolution at a speed slightly greater than that of the disk 8. However, the disk 34 will now have advanced to the position where contact 35 engages contact 37 when the transmitted impulses cease. The armature 38 will again be in the normal unoperated position and contact 39 will again engage contact 40. This completes the circuit thru the electro-magnet 43 causing armature 44 to operate in the opposite direction, contact 45 thus engages contact 48 and so short circuiting resistance 50 in the field circuit of the motor 52. This reduces the torque and speed of said motor 52 to approximately the torque and speed of the phonic wheel motor M. The phonic wheel motor will then operate to keep the disk 34 in synchronism as to speed of rotation and phase relation with the sending analyzing disk 8. It is obvious that if for any reason after the initial framing, the receiving member were to get out of phase, the aforementioned correcting devices would automatically correct the phase relation as hereinbefore described.

In order to compensate for any lag in operation due the mechanical inertia of the devices used, contacts 36 and 37 attached to insulating piece 38 are movable. Once adjusted for any given set of devices, no further attention is necessary.

It is obvious that the form of apparatus as shown and described, is a combination of two circuits. One circuit contains the phonic wheel motor M and may be used alone to secure synchronous speed of rotation of the receiving composing disk 34; but the initial framing of the image would have to be corrected by some other means, either manually or automatically; the other circuit contains the phase correcting device. This latter circuit could be used alone to give synchronism of the speed of rotation as well as proper phase relation, but would not take care of the slight variation in the speed of the receiving disk which might occur during a revolution. We therefore combined the two systems as a form of apparatus best suited to carry out our method of synchronization of motion and phase relation between the sending and receiving members.

Although we have shown and described our invention in considerable detail, we do not wish to be limited to the specific details thereof, as simplicity in explanation and apparatus governed us, but may use such modifications, substitutions or equivalents thereof, as are embodied within the spirit of our invention.

What we claim as new and desire to secure by Letters Patent of the United States is:

1. In apparatus for the transmission of pictures or for television or the like, the method of maintaining synchronism of motion and phase relation between the sending and receiving members which consists in increasing the intensity of the image impulse at the end of each analysis of successive line elements to produce increased primary current impulses, and in separating the increased primary current impulse produced at the end of a complete analysis of the picture from the increased primary current impulse produced at the next analysis of a successive line element to produce a secondary current impulse and utilizing said current impulses transmitting said current impulses to the receiving station to govern the speed of the receiving member, and automatically correct and maintain it in phase with the sending member so as to secure proper framing of the image at the receiving station.

2. In apparatus for the transmission of pictures or for television or the like, the method of maintaining synchronism of motion and phase relation between the sending and receiving members which consists in utilizing the same source of light to increase the intensity of the image impulse at the end of each analysis of successive line elements to produce increased primary current impulses, and in separating the increased primary current impulse produced at the end of a complete analysis of the picture from the increased primary current impulse produced at the next analysis of a successive line element to produce a secondary current impulse transmitting said current impulses to the receiving station and utilizing said current impulses to govern the speed of the receiving member, and automatically correct and maintain it in phase with the sending member so as to secure proper framing of the image at the receiving station.

3. In apparatus for the transmission of pictures or for television or the like, the method of maintaining synchronism of motion and phase relation between sending and receiving members which consists in increasing the intensity of the image impulse occurring at the end of each analysis of successive line elements to produce increased primary current impulses, and in separating the increased primary current impulse produced at the end of a complete analysis from the increased primary current impulse produced at the next analysis of a successive line element by an interval which is greater than the intervals between the said primary current impulses, to produce a secondary current impulse transmitting said current impulses to the receiving station and in utilizing said current impulses to govern the speed of the receiving member and automatically correct and maintain it in phase with the sending member so as to secure proper framing of the image at the receiving station.

4. In apparatus for the transmission of pictures or for television or the like, the method of maintaining synchronism of motion and phase relation between sending and receiving members which consists in utilizing the same source of light to increase the intensity of the image impulse occurring at the end of each analysis of successive line elements to produce increased primary current impulses, and in separating the increased primary current impulse produced at the end of a complete analysis from the increased primary current impulse produced at the next analysis of a successive line element by an interval which is greater than the intervals between the said primary current impulses, to produce a secondary current impulse transmitting said current impulses to the receiving station and in utilizing said current impulses to govern the speed of the receiving member and automatically correct and maintain it in phase with the sending member so as to secure proper framing of the image at the receiving station.

5. In a synchronizing system a sending member comprising a perforated disk provided with a series of openings in which the angular distance between the last opening and the first opening is greater than the angular distance between the other openings, a screen with an aperture whose width is greater than the angular distance between any two openings of said disk, cooperating with said sending disk to produce current impulses, means for transmitting said current impulses to said receiving station and means responsive to said current impulses to govern the speed of the said receiving member.

6. In combination with a system for electrical communication comprising a sending and a receiving device, apparatus for synchronizing the operating speed of said devices and securing correct framing at the receiving station comprising a primary means responsive to the current impulses produced as a result of increasing the intensity of the image impulse at the end of each analysis of a line element, primary driving mechanism controlled by said primary means to maintain synchronism of motion between said sending and receiving members, secondary means responsive to the current impulses produced as a result of separating the increased image impulse occurring at the end of a complete analysis by an interval which is different from the intervals between the successive analysis of a line element which make up a complete analysis, secondary driving mechanism, adjustable correcting mechanism under the control of said secondary driving mechanism and cooperating with said secondary means to control the speed of said secondary driving mechanism to bring said receiving member into phase with said sending member so as to secure proper framing.

7. In combination with a television or picture transmission system or the like sending and receiving members located respectively at sending and receiving stations, apparatus for synchronizing the operating speeds of said members and securing correct framing at the receiving station, comprising at the sending station means for increasing the intensity of the image impulse at the end of each analysis of successive line elements to produce increased primary current impulses, means for separating the increased current impulse produced at the end of a complete analysis from the primary increased current impulse produced at the next analysis of a line element to produce increased secondary current impulses, means for transmitting said current impulses to said receiving station, primary means at said receiving station responsive to said primary current impulses, primary driving mechanism controlled by said primary means to maintain synchronism of motion between said sending and receiving members, secondary means responsive to said secondary current impulses, adjustable correcting mechanism under the control of said secondary means and cooperating with said correcting mechanism to control the speed of said secondary driving mechanism to bring said receiving member into phase with said sending member.

8. In apparatus for the transmission of pictures, or for television or the like, means for automatically correcting and maintaining the proper phase relation between sending and receiving members so as to secure proper framing of the picture or the like at the receiving station, comprising a relay, adjustable correcting means, driving means under the control of said relay and cooperating with said adjustable correcting means to control the speed of the receiving member.

9. In a synchronizing system an electromagnet and armature vibrating between a set of contacts causing a phonic wheel motor to operate, which regulates the speed of the receiving device so as to secure synchronism of motion, a driving motor so adjusted that it rotates the receiving device at a higher speed and torque than the sending device and causing the phonic wheel motor to slip as long as a resistance is in series with the field winding of the driving motors and hence causing a given opening on the receiving device to advance with respect to the corresponding opening on the sending device, an electro-magnet and armature of a "slow acting" type relay and a rotating contact which engages alternately with one of two adjustable contacts, completes the circuit through either of two electro-magnets of a polarized relay, which operates an armature which short circuits the resistance in the field circuit of the driving motor and thus reducing the speed and torque of said motor to approximately that of the phonic wheel motor, which will then operate to keep the receiving device in synchronism as to speed of rotation and phase relation with the sending analyzing device.

10. In combination with an apparatus for electrical communication between a sending and receiving station, a synchronizing system comprising at the sending station an analyzing member containing a plurality of uniformly spaced analyzing openings so arranged that the angular distance between the last analyzing opening and the first analyzing opening is greater than the uniform angular distance between the other analyzing openings, an analyzing screen having a width greater than the uniform distance between the said successive analyzing openings, a composing member similar in construction to the analyzing member, a composing screen whose width is less than the uniform distance between the successive composing openings, an electro-magnet and armature vibrating between a set of contacts causing a phonic wheel motor to operate, which regulates the speed of the said receiving device so as to secure synchronism of motion, a driving motor so adjusted that it rotates the said receiving device at a higher speed than the said sending device and causing the phonic wheel motor to "slip" as long as a resistance is in series with the field winding of the driving motor and hence causing a given opening on the receiving device to advance with respect to the corresponding opening on the said sending device, a "slow acting" type relay and a rotating contact which engages alternately with one of two adjustable contacts, completes the circuit through either of two electro-magnets of a polarized relay to short circuit the resistance in the field circuit of the driving motor and thus reduce the speed of said motor to approximately that of the phonic wheel motor, which will then operate to keep the said receiving device in synchronism of speed of rotation with the sending analyzing device, and automatically correct and maintain the proper phase relation between said sending and receiving members so as to secure proper framing of the object at said receiving station.

11. In combination with a television or picture transmission system or the like, sending and receiving members located respectively at sending and receiving stations, apparatus for synchronizing the operating speeds of said members and to secure correct framing at the receiving station, comprising at the sending station impulse transmitting means, at the receiving station impulse receiving means, a relay responsive to certain of said impulses, circuit-closing means controlled by said relay, a circuit including the said circuit-closing means, a driving means in said circuit adapted to operate according to the closing and opening of said circuit through said circuit-closing means, a composing member under the control of said driving means, a second circuit-closing means under the control of said composing member, a second relay responsive to certain other of said impulses originating at the transmitting station, a third circuit-closing means controlled by said second relay, a second circuit including said second circuit-closing means, said third circuit-closing means, and a third relay in said second circuit adapted to operate according to the opening and closing of said second circuit through said second and third circuit-closing means, a fourth circuit-closing means under the control of said third relay and a third circuit comprising said fourth circuit-closing means, and a second driving means controlled by said fourth circuit-closing means to advance or retard the relative position of said composing member with respect to said analyzing member.

12. In combination with a television or picture transmission system or the like, sending and receiving members located respectively at sending and receiving stations means for automatically correcting and maintaining the correct phase relation between said sending and receiving members, comprising at the sending station impulse transmitting means and at the receiving station impulse receiving means, a composing member, a relay responsive to certain of said impulses, a circuit-closing means under the control of said composing member, a second circuit-closing means controlled by said relay, a circuit including said circuit-closing means and a second relay, adapted to operate according to the opening and closing of said circuit through said circuit-closing means and said second circuit-closing means, a third circuit-closing means under the control of said second relay and a second circuit comprising said third circuit-closing means and a correcting mechanism controlled by said third circuit-closing means to advance or retard the relative position of the composing member with respect to the analyzing member.

WILBUR F. FUNK.
EDWARD T. KRUGLAK.